United States Patent Office 3,030,401

Patented Apr. 17, 1962

3,030,401

PROCESS FOR PREPARING METAL ALKYLS

David Joseph Movsovic, Timperley, and Gajanan Mahadeo Ranadive, Salford, England, assignors to Shell Oil Company, New York, N.Y., a corporation of Delaware No Drawing. Filed Nov. 29, 1957, Ser. No. 699,439
Claims priority, application Great Britain Dec. 5, 1956
13 Claims. (Cl. 260—448)

This invention relates to the preparation of metal alkyls. More particularly it relates to improvements in the preparation of metal alkyls wherein the metal is selected from beryllium or a metal of group III of the periodic table.

It is known that metal alkyls may be prepared by reacting the metal with an olefin corresponding to the alkyl radicals of the final product. The reaction is normally carried out in the presence of hydrogen and some of the preformed metal alkyl which apparently functions as a catalyst for the reaction. A disadvantage of these prior art methods is that the hydrogen hydrogenates the olefin under the conditions of the reaction so that a substantial portion of the olefin is hydrogenated in a wasteful side reaction. The present invention eliminates this disadvantage.

It is an object of this invention to provide improved processes for the preparation of metal alkyls. More particularly, it is an object of this invention to provide improved processes for the production of metal alkyls wherein the metal is selected from the group consisting of beryllium and a metal selected from group III of the periodic table. It is another object of this invention to provide improved processes for the production of metal alkyls which are now widely used as polymerization catalyst. Other objects will become apparent as the description of the invention proceeds.

These and other objects are accomplished in the process for producing a metal alkyl of the formula $M(R)_n$, wherein M is a metal selected from the group consisting of beryllium and a metal of group III of the periodic table, R is an alkyl radical and $n$ is equal to the valency of the metal, which comprises reacting free metal with hydrogen and an olefin corresponding to R in the above formula, the reaction being conducted in the presence of a preformed metal alkyl, by the improvement which comprises conducting the reaction in the presence of a minor amount of added free halogen. By the modification which comprises conducting the above-described reaction in the presence of added halogen it will be found that the side reactions in which the olefin is hydrogenated is substantially reduced and in some cases virtually inhibits the hydrogenation side reaction.

The processes of this invention are equally adaptable for the preparation of beryllium alkyls as well as metal alkyls wherein the metal is selected from group III of the periodic table, such as aluminum, indium, gallium and scandium. In the preferred embodiment the processes of this invention are applied more often to the preparation of aluminum trialkyls because such compounds have the greatest utility as a catalyst component in the low pressure processes for the polymerization of alpha-olefins.

In the improvements of this invention the halogen is present in an amount between 0.01 and 10% by weight of the metal starting material. More preferred however the halogen is present in an amount between 0.5 and 5% by weight of the metal. In another preferred embodiment of the invention the halogen is selected from those which are normally solid or liquid such as iodine or bromine because they are easier to disperse in the reaction medium. Although the normally gaseous halogens may be used, i.e. chlorine or fluorine, they are less preferred also because they are more difficult to handle.

In carrying out the present invention, the metal is charged to the reactor in a finely divided state thereby affording a larger surface area and proportionately shorter reaction times. It is a particularly outstanding advantage of the present invention that the metal may be either a commercial grade or in the substantially pure form. Heretofore such latitude was not permitted because hydrogenation of the olefin was more pronounced when pure metals were used because, it is believed, they acted as a catalyst for the hydrogenation reaction.

The reaction temperatures range in the order of about 60–130° C. with 120–130° C. being preferred. The operating temperature will depend somewhat on the operating pressures and the specific olefin involved. In conducting the reaction the metal is charged to the reactor, which is a pressure vessel of any conventional design, together with the halogen and a small amount of aluminum trialkyl as the catalyst, which is the same as the desired final product. The reactor is then sealed and hydrogen is fed to the reactor in an amount from about 5 to 100 atmospheres. The temperature is raised and the olefin, preferably in the gaseous state, is also pressured in so that the total pressure of the hydrogen and the olefin ranges between 40 and 300 atmospheres. With constant agitation the reaction is permitted to proceed until completion which may range from 5 to 20 hours depending upon the metal, temperatures, pressures, olefin and the like.

The above described procedures is particularly suitable where the olefin is normally a gas or may be easily gasified. It is particularly suitable for the production of aluminum trialkyls such as aluminum trimethyl, aluminum tripropyl, aluminum tributyl and other lower metal alkyls. The process is also suitable for the production of metal alkyls wherein the alkyl radicals have as many as nine, or more, carbon atoms such as in the production of aluminum trinonyl.

The preparation of the metal alkyls according to the present invention may be conducted in a single pressure vessel as indicated above. Further, the processes of this invention are adaptable to continuous methods of operation using two reactors in which case the first comprises a reactor having two compartments arranged to form part of a flow circuit. In the first compartment a probable reaction according to the formula

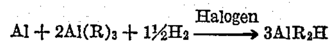

$$Al + 2Al(R)_3 + 1\tfrac{1}{2}H_2 \xrightarrow{\text{Halogen}} 3AlR_2H$$

is carried to substantial completion. It is desirable to have present an inert hydrocarbon solvent during this reaction. The presence of the halogen at this stage is advantageous in reducing the dissociation of the aluminum alkyl into aluminum dialkyl monohydride and olefin by preventing the removal of olefin by hydrogenation. The second compartment of the first reactor acts as a settling zone from which a mixture of the metal alkyl and byproducts of the reaction can be removed to a further reactor in which the by-products may be further reacted or removed. Unreacted metal is recirculated from the settling zone through the first compartment, together with additional metal alkyl catalyst. The halogen may be added separately to the first compartment or it may be added in a mixture with fresh metal slurry supplied thereto.

The processes of this invention are described in greater detail in the following examples.

*Example 1*

An autoclave having an efficient stirring device is charged with 210 parts by weight of finely-divided aluminum and 233 parts, by weight, of aluminum tri-isobutyl and the resulting mixture is heated to 130° C. under a hydrogen pressure of 5 atmospheres. The pressure is then raised to 40 atmospheres by injection of further hydrogen, after which a 2:1 mixture of isobutene and hydrogen is passed through the stirred reaction mixture for 16 hours. A yield of 220 parts of aluminum tri-isobutyl (i.e. additional to that supplied to the autoclave), together with 207 parts of by-product isobutane, is obtained.

This procedure is then repeated under substantially the same conditions except that, in accordance with the present invention, a small quantity amounting to 2 parts, by weight, of iodine, is mixed with aluminum before addition to the autoclave. A yield of 320 parts of aluminum tri-isobutyl is obtained, with substantially no isobutane by-product being formed.

*Example II*

The autoclave is charged with 100 parts of finely divided commercial grade aluminum, 240 parts of isobutene and 40 parts, by weight, of aluminum tri-isobutyl. The autoclave is then pressured to 5 atmospheres with hydrogen and the contents heated to 120° C. at which temperature the pressure is raised to 120 atmospheres. Pressure is maintained at 120 atmospheres for 15 hours by the addition of further hydrogen. A yield of 220 parts of aluminum tri-isobutyl (i.e. additional to that supplied initially), together with 90 parts of isobutane is obtained.

This procedure is repeated under substantially the same conditions except that 5 parts of iodine are added initially to the autoclave. A yield of 225 parts of aluminum tri-isobutyl is obtained with substantially no isobutane being recovered.

*Example III*

To an autoclave equipped with an agitator as in Example I is charged 25 parts of finely divided aluminum and about an equal amount of triethylaluminum. Thereafter about .05 part, by weight, of bromine are charged to the reactor which is then closed. Hydrogen is pressured to the reactor until the pressure reaches 5 atmospheres and an additional 10 atmospheres of ethylene is fed into the reactor. With constant agitation the temperature is raised to about 80° C. After about 5 hours of reacting the reaction is terminated by venting off the excess gases, which are found to be free of ethane. In a companion experiment in which the bromine is not employed it is found that the vented gases contain substantial amounts of ethane.

*Example IV*

The procedure of Example I is repeated except that octene-1 is initially charged to the reactor. After the reaction is completed aluminum trioctyl is recovered, with only a trace of octane being recovered from the reaction products.

*Example V*

The procedure of Example I is repeated using beryllium in place of the aluminum. The catalyst in this experiment is beryllium diisobutyl. The final product is beryllium diisobutyl, in excess of that added as the catalyst, with only trace amounts of isobutane being isolated.

*Example VI*

The autoclave referred to in Example I is charged with 100 parts of finely divided aluminum in the form of powder produced by atomizing aluminum wire in an atmosphere of nitrogen, after which 240 parts of isobutene and 40 parts of aluminum triisobutyl is added. The autoclave is heated to 130° C. and at the same time it is pressurized to 120 atmospheres by addition of hydrogen. The reaction is continued for 15 hours during which time the pressure gradually drops to 80 atmospheres as no further hydrogen is added. A yield of 90 parts of aluminum triisobutyl (i.e. additional to that supplied initially) is obtained after filtering.

The run was repeated under substantially the same conditions except that 5 parts of iodine are added initially to the autoclave. A yield of 205 parts of aluminum triisobutyl is obtained and the pressure at the end of the reaction is 70 atmospheres: substantially no isobutane by-product is formed.

The finely divided aluminum used in Example VI is prepared by induction heating of aluminum wire followed by feeding olefin under pressure over the heated aluminum wire and thereafter condensing the olefin thereby producing a slurry of the finely divided aluminum. The process by which the aluminum wire is atomized is conducted in an inert atmosphere and this procedure is found to be a particularly suitable method for preparing the aluminum for use in the present invention because it simplifies the preparation of the fine aluminum as compared to grinding or by preparing shavings or chips of aluminum in an inert atmosphere. Further, it has the advantage that oxygen and moisture may be excluded from the aluminum thereby permitting a more pure form of aluminum to be employed.

The reaction product produced by the process of this invention will contain some unreacted aluminum powder which is separated more simply by filtering or centrifuging the reaction mixture which may sometimes be characterized by a dark color which is attributed to the presence of the aluminum powder. In filtering the solution it is found that the use of a filter aid will permit more rapid filtration as well as clarifying the product. Such filter aids may be selected from various clays and earths such as bentonite clays, montmorillonite, fuller's earth, and the like, and are employed in amounts ranging from about 2–4% by weight of the total reaction product. The advantages of filtering in the presence of a filter aid is illustrated by Example VII.

*Example VII*

The procedure of Example VI, using the iodine, is repeated and the product is agitated with 3% by weight of fuller's earth. Upon filtering the product it is observed that the aluminum triisobutyl has an improved color in addition to which the filtration time is substantially reduced.

Persons skilled in the art will appreciate that a principal advantage obtained by the present invention is that higher metal alkyls may be prepared, as aluminum trioctyl, in a simple and efficient manner.

We claim as our invention:

1. In the process for producing a metal alkyl of the formula $M(R)_n$, wherein M is a metal selected from the group consisting of beryllium and a metal of group III of the periodic table, R is an alkyl radical and $n$ is equal to the valency of the metal, which comprises reacting free metal with hydrogen and an olefin corresponding to R, the reaction being conducted in the presence of a preformed metal alkyl of the formula $M(R)_n$, the improvement which comprises conducting the reaction in the presence of between 0.01 and 10% based on the weight of the metal of added free halogen selected from the group consisting of bromine and iodine, the said reactions being conducted at temperatures ranging from about 60 to about 130° C. and pressures ranging from about 40 to about 300 atmospheres.

2. The process of claim 1 in which the metal is aluminum.

3. The process of claim 1 in which the olefin has from 1 to 10 carbon atoms.

4. The process of claim 1 in which the olefin is ethylene.

5. The process of claim 1 in which the olefin is isobutene.

6. The process of claim 1 in which the halogen is bromine.

7. The process of claim 1 in which the halogen is iodine.

8. A process for producing aluminum triisobutyl which comprises reacting aluminum with hydrogen and isobutene in the presence of preformed aluminum triisobutyl and between 0.01% and 10%, based on the weight of the aluminum of free halogen selected from the group consisting of bromine and iodine, the said reactions being conducted at temperatures ranging from about 60 to about 130° C. and pressures ranging from about 40 to about 300 atmospheres.

9. The process of claim 8 in which the free halogen is iodine.

10. The process of claim 8 in which the free halogen is bromine.

11. The process for producing aluminum triethyl which comprises reacting aluminum with hydrogen and ethylene in the presence of aluminum triethyl and between 0.01 and 10% based on the weight of the aluminum of free halogen selected from the group consisting of bromine and iodine, the said reactions being conducted at temperatures ranging from about 60 to about 130° C. and pressures ranging from about 40 to about 300 atmospheres.

12. The process of claim 11 in which the halogen is iodine.

13. The process of claim 11 in which the halogen is bromine.

References Cited in the file of this patent

UNITED STATES PATENTS 2,271,956 Ruthruff ---------------- Feb. 3, 1942

OTHER REFERENCES

Ziegler (Germany), Patentanmeldung Z 3966, published October 18, 1956.